United States Patent
Sellin (10) Patent No.: US 6,215,394 B1
(45) Date of Patent: Apr. 10, 2001

(54) AIR BRAKE STROKE ADJUSTMENT MONITORING APPARATUS AND METHOD

(75) Inventor: Wilhelm Karl Sellin, Kamloops (CA)

(73) Assignee: Brakeminder Canada Inc. (CA)

( * ) Notice: Subject to any disclaimer, the term of this patent is extended or adjusted under 35 U.S.C. 154(b) by 0 days.

(21) Appl. No.: 09/128,239

(22) Filed: Aug. 3, 1998

(30) Foreign Application Priority Data

Aug. 5, 1997 (CA) .................................................. 2209180

(51) Int. Cl.$^7$ ...................................................... B60Q 1/00
(52) U.S. Cl. ................... 340/453; 340/454; 188/1.11 R; 188/1.11 W; 188/1.11 L; 188/1.11 E
(58) Field of Search ..................................... 340/453, 454, 340/438; 188/1.11 R, 1.11 W, 1.11 L, 1.11 E (56) References Cited

U.S. PATENT DOCUMENTS

| | | | |
|---|---|---|---|
| 3,986,164 | 10/1976 | Hiral et al. | 340/52 A |
| 4,009,465 | 2/1977 | Rigalt | 340/52 A |
| 4,020,454 | 4/1977 | Malonee | 340/52 B |
| 4,583,071 | 4/1986 | Sebalos | 340/52 B |
| 4,757,300 | 7/1988 | Sebalos | 340/52 B |
| 4,800,991 | 1/1989 | Miller | 188/1.11 L |
| 4,855,712 | 8/1989 | Wiley et al. | 340/453 |
| 4,937,554 | 6/1990 | Herman | 188/1.11 L |
| 5,206,625 | 4/1993 | Davis | 340/454 |
| 5,226,509 | 7/1993 | Smith | 340/454 |
| 5,310,023 | 5/1994 | Martinez | 188/1.11 L |
| 5,572,187 | 11/1996 | Williford | 340/454 |
| 5,689,231 | 11/1997 | Olson | 340/454 |
| 5,753,807 | * 5/1998 | Trueman et al. | 73/121 |
| 5,825,287 | * 10/1998 | Zarybnicky et al. | 340/453 |

FOREIGN PATENT DOCUMENTS 1060560   8/1979   (CA) ..................................... 340/137

OTHER PUBLICATIONS

Mr. Safety Check (Tm) Systems Inc. of Toronto, Ontario, Canada. Electronic Air Brake Stroke Monitor (6 pages) published prior to Aug. 3, 1997.

C&J Technology Inc. of Bloomington, Minnesota, USA. "Brake Alert" —electronic brake monitor (2 pages) published prior to Aug. 3, 1997.

CET Quadratech of Saint Jerome, Quebec, Canada. "Brake Guardian" —electronic brake monitor (2 pages) published prior to Aug. 3, 1997.

MGM Brakes of Charlotte, North Carolina, USA. "Electronic Stroke Alert" brake monitor (2 pages) published prior to Aug. 3, 1997.

* cited by examiner

*Primary Examiner*—Daryl Pope
(74) *Attorney, Agent, or Firm*—Fulbright & Jaworski L.L.P.

(57) ABSTRACT

The invention provides an electrical switch for monitoring stroke adjustment of an air brake as used on heavy wheeled vehicles. The switch has a switch body securable to fixed structure of the air brake, and fixed and moveable electrical switch contacts in which the fixed switch contact is fixed relative to the switch body. A switch actuator moves relative to the body and carries the moveable switch contact into and out of engagement with the fixed switch contact. The switch actuator is selectively responsive to movement of brake mechanism associated with the air brake actuation. A resilient member cooperates with the switch actuator and the body to close the switch contacts. The switch actuator passes through an opening in an air chamber of the brake and, when the brake is properly adjusted, is clear of a diaphragm plate within the chamber. As the brake is used, brake stroke adjustment eventually exceeds acceptable limits and the diaphragm plate contacts the switch actuator which is moved to open the contacts to actuate a monitor to warn the vehicle operator. The switch is fitted to an existing brake chamber using fasteners passing through openings in the chamber, or can be fitted adjacent the chamber using a bracket secured to existing fasteners.

29 Claims, 6 Drawing Sheets

AIR BRAKE STROKE ADJUSTMENT MONITORING APPARATUS AND METHOD

FIELD OF THE INVENTION

The invention relates to a device for monitoring adjustment of air brakes as used on heavy vehicles such as trucks, truck trailers and buses.

BACKGROUND OF THE INVENTION

Government regulations require proper adjustment of vehicle brakes, the adjustment being usually measured by movement of a pushrod which actuates cam devices, which in turn expand brake shoes against a brake drum of the wheel to be braked. Brake operation results in brake wear, and an increase in pushrod travel or stroke results from brake lining wear, drum wear, component strain and drum expansion at high temperature. A need for brake stroke adjustment is usually indicated by excessive pushrod travel, and there are many prior art monitoring devices which are responsive to excessive pushrod travel to indicate a need for stroke adjustment to a vehicle operator. Some of the prior art devices can be classified into several groups as below.

Some monitors utilize an electrical sensor switch which is actuated following excessive pushrod travel and generates an alarm signal, e.g. by illuminating a light or emitting a warning sound, etc. The switch has normally open switch contacts which are closed when a threshold of pushrod travel is attained. While such devices are simple, they are dependent on a functioning electrical circuit to operate the alarm. If there were an inadvertent break in the electrical circuit, or a poor electrical contact between the contacts of the switch, the monitoring alarm would not be actuated, and the vehicle operator would not be aware that the brakes were out of adjustment. Such occurrences can result from broken wires or corroded connections due to heavy vibration and/or exposure of sensitive portions of the device to contamination from dirt and moisture. Thus, this type of device is not considered to be "fail safe", and therefore undesirable as it may create a false sense of security even when inoperative. Devices of this general type are found in U.S. Pat. No. 5,226,509 (Smith) and U.S. Pat. No. 4,800,991 (Miller).

Other types of monitors utilize magnetic proximity devices which detect excessive brake pushrod travel when one component of the proximity device passes close to a cooperating component of the device. As in any magnetic proximity switch application, accurate control of spacing between the two cooperating components of the device is necessary, and this can be difficult to attain in the harsh environment of air brakes used on trucks which are exposed to wide temperature fluctuations, heavy vibration, thrown rocks, and contaminants such as dirt and moisture. Devices of this general type are shown in U.S. Pat. No. 4,937,544 (Herman) which uses a proximity dependent oscillator, and U.S. Pat. No. 4,757,300 (Sebalos) which uses a proximity or magnetic switch arrangement.

Other types of monitors have been used, for example U.S. Pat. No. 5,689,231 (Olson) discloses a rotation sensor device mounted to detect relative rotation between the pushrod and an arm of a slack adjuster cooperating with the brake cams. The sensor device may involve rather elaborate circuitry and high costs.

Most of the devices disclosed above would not necessarily indicate to the operator that there is a failure in the monitoring system, and thus the operator would be unaware that the brake adjustment was not being monitored, and could operate the vehicle with out of adjustment brakes without any warning. Other devices are relatively complex and require installation of costly new equipment for each wheel, and this discourages installation due to high installation and acquisition costs. In addition, some devices require complex maintenance routines involving specific technical skills which may also discourage their use.

Automatic slack adjusters have been developed to simplify brake stroke adjustment, but it has been found that most automatic slack adjusters also require proper and regular maintenance to ensure continued operation, and the maintenance itself is considered, by some operators, to be excessively time consuming. Without proper maintenance, automatic slack adjusters can become inoperative, resulting in the vehicle being operated with out of adjustment brakes.

SUMARY OF THE INVENTION

The present invention reduces the difficulties and disadvantages of the prior art by providing a relatively simple and low cost sensor which can be easily incorporated into a standard air brake chamber during actual manufacturing and assembling of the brake components, or, in some instances can be incorporated as a "retro-fit" unit on existing components. The invention automatically activates a simple alarm should brake wear or other factors result in pushrod travel that exceeds a predetermined amount, thus indicating a need for brake stroke adjustment. The device is also arranged to provide a warning signal if there is an open current failure in the sensor circuit, such as a broken wire, thus alerting the vehicle operator that the status is not being monitored. Thus, the device is "fail-safe", at least within a context of broken wires or corroded contacts, and furthermore can be installed for a relatively low cost, with minimal skill and cost requirements for maintenance.

An electrical switch for an air brake stroke monitoring apparatus comprises a switch body, fixed and moveable electrical switch contacts, a switch actuator and a resilient member. The switch body is securable to a fixed structure associated with the air brake and the fixed switch contact is fixed relative to the switch body. The switch actuator is mounted for movement relative to the body and cooperates with the moveable switch contact to move the moveable contact into and out of engagement with the fixed switch contact. The switch actuator is selectively responsive to movement of brake mechanism associated with air brake actuation. The resilient member cooperates with the switch actuator and the body to apply force to the switch actuator to urge the switch contacts together.

In one embodiment, the fixed and moveable switch contacts have complementary shapes, and preferably the fixed switch contact has a female truncated conical surface and the moveable switch contact has a male truncated conical surface. The switch actuator is an axially elongated plunger mounted for reciprocable movement along an axis thereof and the moveable switch contact is mounted on the plunger. Preferably the resilient member is a compression coil spring encircling the plunger to apply an axial force thereto. Also, preferably the compression coil spring is electrically conducting and extends between the moveable switch contact and a body contact so that the moveable switch contact provides a continuous electrical monitoring circuit through the compression coil spring and body contact.

An air brake apparatus for actuating a brake comprises an air brake chamber, an electrical brake stroke monitoring switch and a brake status monitor. The air brake chamber comprises a chamber body, a flexible diaphragm and a pushrod and diaphragm plate assembly. The flexible diaphragm cooperates with the body to divide the body into first and second spaces which are exposable to a pressure differential. The pushrod and diaphragm plate assembly are mounted for reciprocable axial movement relative to the chamber body and cooperate with the diaphragm to be responsive to the pressure differential. The pushrod has an outer end connectable to brake actuating structure associated with the brake. The electrical brake stroke monitoring switch has a switch body securable to fixed structure associated with the brake chamber. The monitoring switch also has a switch actuator, fixed and moveable electrical switch contacts, and a resilient member. The switch actuator is responsive to movement of the pushrod. The fixed switch contact is fixed relative to the switch body and the moveable switch contact is responsive to movement of the switch actuator. The resilient member cooperates with the switch actuator to apply force thereto to urge the switch contacts together. The brake status monitor cooperates with the brake stroke monitoring switch and an electrical power source to be responsive to status of the monitoring switch to indicate to an operator unacceptable brake stroke.

The chamber body has an access opening therein and the monitoring switch is secured adjacent the access opening. The switch actuator extends through the access opening to be contacted by the diaphragm plate when subjected to a predetermined travel which represents unacceptable brake stroke so as to open the switch contacts. In one embodiment, a portion of the chamber body adjacent the access opening has an indentation extending at least partially around the access opening, and the switch body has a projection which is received in the indentation to locate the switch body.

A method of monitoring brake stroke in an air brake apparatus comprises the steps of:

during brake actuation in which the brake stroke is acceptable, maintaining electrical switch contacts of a brake stroke monitoring switch closed to conduct electricity to indicate acceptable brake stroke adjustment, and during brake actuation in which the brake stroke is unacceptable, opening the electrical contacts to actuate a monitor to indicate unacceptable brake stroke adjustment.

Preferably, the electrical switch contacts are maintained closed resiliently and the electrical switch contacts are opened by movement of brake mechanism associated with air brake actuation.

A detailed disclosure following, related to drawings, describes several embodiments of an apparatus according to the invention and the related method of operation, the invention being capable of expression in structure and method other than those particularly described and illustrated.

DETAILED DESCRIPTION

Figure 1:
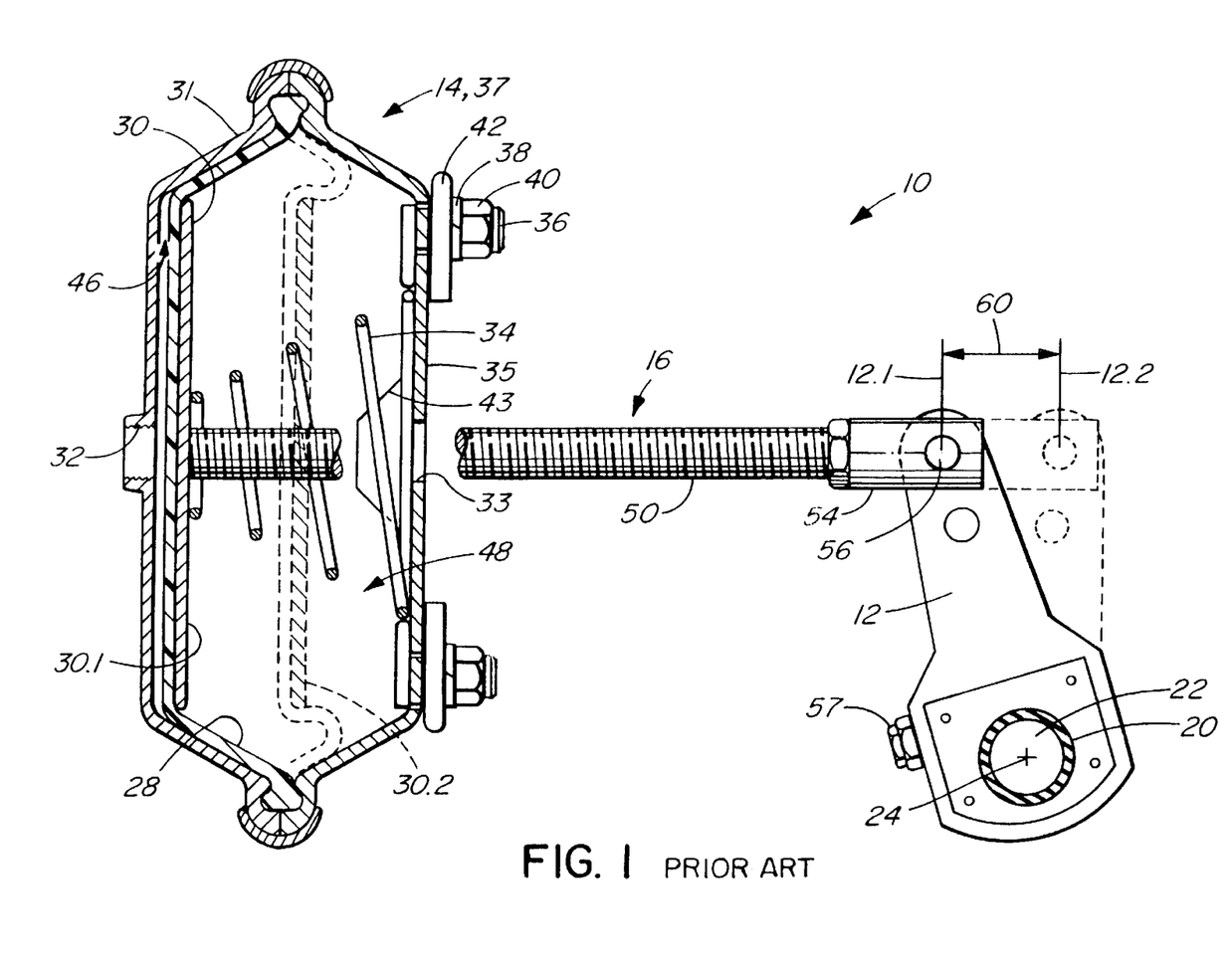
FIG. 1 is a simplified, partially sectioned, fragmented side elevation of a wheel brake apparatus, according to prior art.

FIG. 1

A portion of a conventional air brake apparatus, as mounted on a heavy wheeled vehicle, is shown generally at 10. The apparatus includes a slack adjuster 12, an air brake chamber 14 and a pushrod 16 (shown fragmented) extending from the air brake chamber 14 to cooperate with the slack adjuster 12. The slack adjuster 12 has an internal spline 20 which engages a complementary external spline on a brake actuator shaft 22 which rotates about an axis 24 and rotates a cam which engages wheel brake shoe apparatus (not shown). The shoe apparatus includes a brake shoe return spring for disengaging the brake shoes and for assisting in returning the brake actuator shaft 22 such that slack adjuster 12 attains a rest position 12.1 as shown in full outline. The wheel brake shoe apparatus activates wheel brake operation in response to movement of slack adjuster 12 to an activated position shown in broken outline at 12.2.

The air chamber 14 has a flexible diaphragm 28 located adjacent a diaphragm plate 30 which is rigidly connected to the pushrod 16. The air chamber 14 has a rear end plate 31 with a compressed air connection 32 leading to brake controls on the vehicle. The air chamber 14 has a service end plate 35 having a clearance opening 33 to accept the pushrod 16. The diaphragm has an outer periphery sandwiched between and secured to the end plates 31 and 35 to provide the well known unit. The end plates 31 and 35, also termed first and second body portions, thus form a chamber body 37 which is securable to a fixed structure associated with the vehicle using fasteners 36, lock washers 38 and nuts 40 which affix the air chamber 14 to a mounting plate 42 on the vehicle. A return spring 34 encircles the pushrod 16 and is fitted between the service end plate 35 and the diaphragm plate 30 to urge the diaphragm plate 30 towards the rear service end plate 31 as shown. In this instance, the service end plate 35 also has a pair of diametrically opposed indentations 43 (one only being shown in FIG. 1) which serve as a diaphragm travel limiter or stop and also centre the spring 34 relative to the plate 35.

The air chamber 14 is divided by the diaphragm 28 into a first or compressed air space 46 adjacent the first body portion or end plate 31, and a second or atmospheric air space 48 adjacent the second body portion or end plate 35. When pressure in the compressed air space 46 is approximately equal to atmospheric pressure, which is normally present in atmospheric air space 48, the diaphragm is urged to a full rest position 30.1 by the brake shoe return spring.

When pressure in the compressed air space 46 is increased above atmospheric pressure through the connection 32 in response to operation of vehicle brakes by the vehicle operator, restoring forces applied by the brake shoe return spring and the spring 34 are opposed by pressure on the diaphragm 28, and the diaphragm plate is urged toward a braking position 30.2 (broken outline). This movement causes the pushrod 16 to bear upon a pivot pin 56, which rotates the slack adjuster 12 from the rest position 12.1 toward the broken line actuated position 12.2. If the brakes are properly adjusted, at some intermediate position the brake shoe apparatus will contact the brake drum, at which point braking force is applied to the wheel and further movement of the pushrod 16 is essentially stopped. Brakes are generally thought to be properly adjusted when a predetermined small amount of motion or "slack" exists between the rest position 12.1 and the actuated position 12.2, to avoid unintended brake engagement when in the rest position 12.1. Thus it can be seen that the first and second air spaces 46 and 48 are exposable to a pressure differential, and the pushrod and diaphragm plate form an assembly which is mounted for reciprocable axial movement relative to the chamber body to be responsive to the pressure differential.

In the present example of prior art, the air chamber 14 is a Type 30 air chamber available from MGM Air Brakes of Charlotte, N.C., U.S.A., in which the diaphragm plate 30 is limited to a maximum travel distance or slack of 2.5 inches from the rest position in a direction toward the indentations 43. Slack greater than 2.0 inches is generally considered to be excessive, ie. out of adjustment, for Type 30 air chambers. A minimum slack of 0.5 inches is generally considered adequate to avoid incidental brake operation when the diaphragm plate 30 is in rest position 30.1.

After successive applications of braking force, some brake friction material is lost and this with other factors result in increased slack, and the slack adjuster 12 moves a slightly greater distance from rest position 12.1 toward the actuated position 12.2 before braking action begins. When slack increases to an unacceptable limit where the diaphragm plate 30 contacts the indentations 43, ie. "bottoms out", further travel of the diaphragm plate 30 is prevented, braking power is impaired and a very dangerous condition is created.

A slack adjuster bolt 57 can be rotated in a manner that alters the position of the slack adjuster 12 about the axis 24 relative to the brake actuator shaft 22 such that slack is decreased to within acceptable limits, permitting maximum braking force to be applied without the diaphragm plate 30 bottoming out.

In many jurisdictions it is mandatory to check and adjust slack on each wheel brake of a vehicle prior to commencing operation of the vehicle on a particular day. Repeated brake operation, especially on vehicles carrying heavy loads or otherwise having to undergo relatively large amounts of brake application, significant brake wear may take place within only a few hours which would be before the next routine inspection. This brake wear, in combination with drum expansion due to heating, can increase slack beyond the safe limit, and impairment of braking may go undetected, a condition under which an accident may likely occur.

Figure 2:
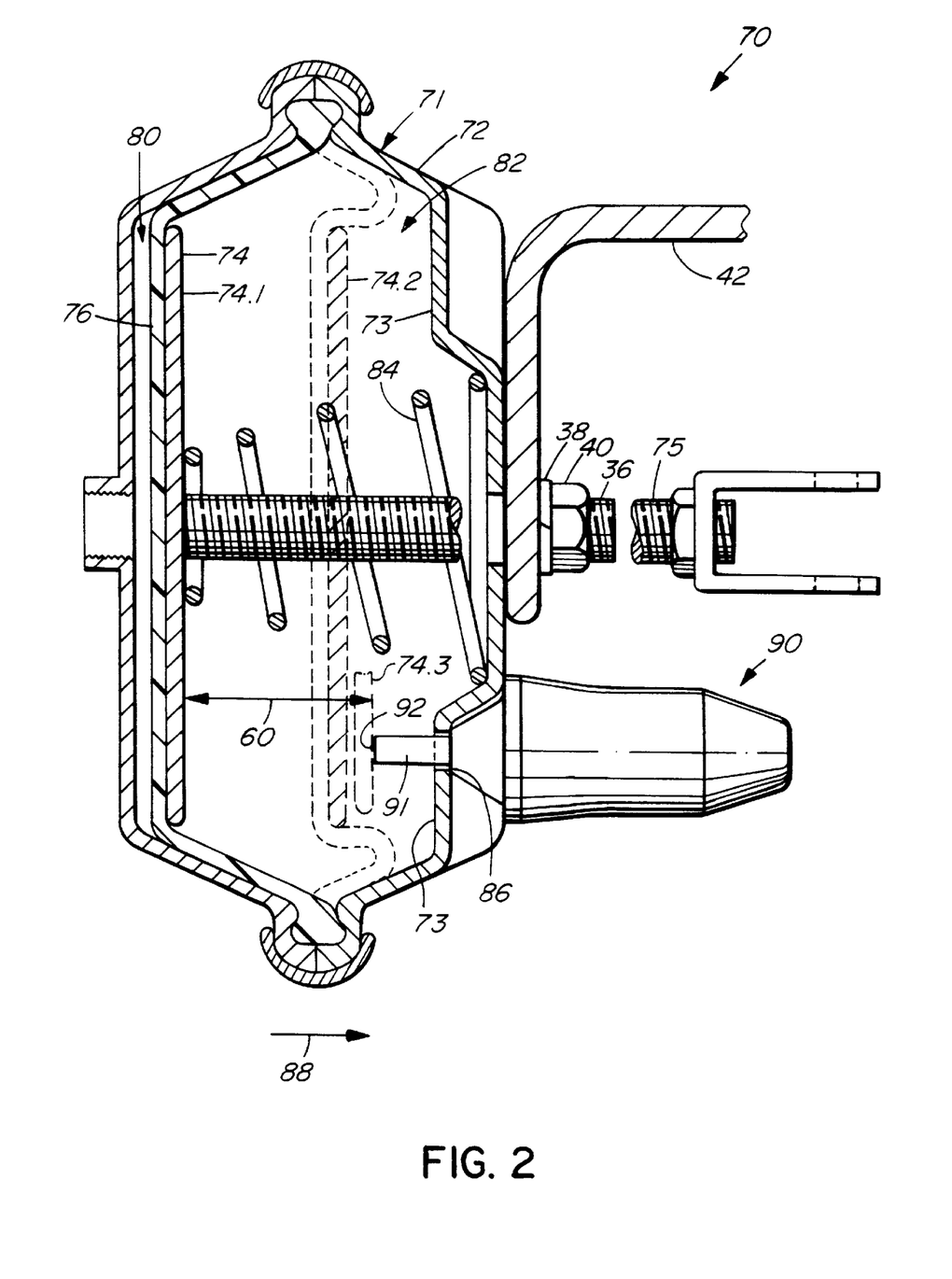
FIG. 2 is a simplified, partially sectioned, fragmented top plan of a wheel brake apparatus incorporating a brake stroke adjustment monitoring switch according to the first embodiment of the invention.
Figure 3:
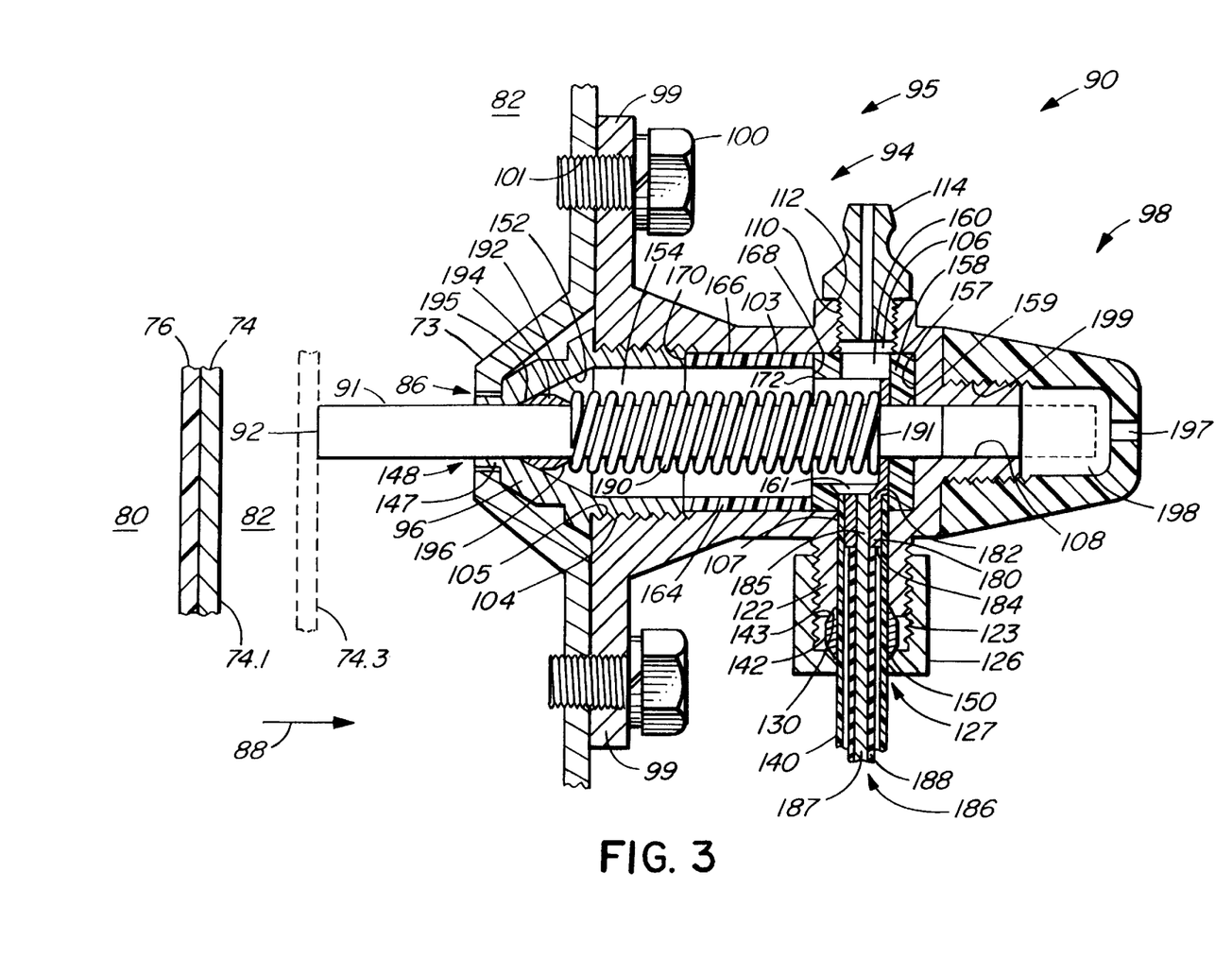
FIG. 3 is a simplified, detailed longitudinal section of the brake stroke adjustment monitoring switch of FIG. 2, according to the first embodiment of the invention.

FIGS. 2 and 3

Referring to FIG. 2, an improved air brake apparatus according to the first embodiment of the invention is shown generally at 70. A standard Type 30 air chamber 71 has a service end plate 72 having two similar indentations 73, and a diaphragm plate 74 and a pushrod 75 secured thereto. As in prior art Type 30 air chambers as described in FIG. 1, a flexible diaphragm 76 provides a movable and air-tight barrier separating a first or compressed air space 80 which is exposable to braking pressure, and a second or atmospheric air space 82 of the air chamber 71. When air pressure within the compressed air space 80 is generally equal to atmospheric pressure as present in atmospheric pressure space 82, forces applied by the brake shoe return spring on the pushrod 75 urge the diaphragm plate 74 toward a rest position 74.1 shown in full outline.

The invention differs from the prior art by providing a brake stroke monitoring switch 90 affixed adjacent one of the indentations 73 of the service end plate 72 of the air chamber 71, the indentation having an access opening 86 which also differs from the conventional service end plate. The brake stroke monitoring switch 90 has an axially elongated plunger rod 91 extending through the opening 86 into the atmospheric air space 82. The plunger rod 91 has a plunger tip 92 which is located at a critical position as follows when the switch is non-activated, that is in a normal operating position. The switch 90 is positioned so that when the diaphragm plate 74 moving in direction of an arrow 88 first contacts the plunger tip 92, the plate has attained a maximum slack position shown in broken outline at 74.3. In other words, further movement of the plate 74 in direction of the arrow 88 represents excessive plate movement, that is the brake is out of adjustment. The rest position 74.1 of the plate is separated from the maximum slack position 74.3 by a distance 60 of approximately 1.75 inches, such distance representing a maximum desirable amount of slack. The diaphragm plate is located in the second space 82 to be contacted by the switch actuator so as to protect the diaphragm 76 from contact with the plunger rod 91.

Referring to FIG. 3, the brake stroke monitoring switch 90 has a switch body 95 comprising a main body portion 94, a locating portion 96, and a protective end cap 98 threadedly connected together as shown. The body portion 94 and the locating portion 96 are fabricated from an electrically conductive and generally non-corroding material such as brass, whereas the end cap 98 can be made of insulating plastic if desired.

The body portion 94 has a pair of diametrically opposed mounting lugs 99 having openings to receive respective bolts 100 which are received in threaded openings 101 provided in service end plate 72 to secure the switch body to a fixed structure associated with the air brake. The body portion 94 has a generally cylindrical inner surface 103, a first internal threaded portion 104 for threadedly engaging external threads 105 of the locating portion 96, a transverse grease passage 106, a transverse wire passage 107, and an axial plunger actuator opening 108. The grease passage 106 has internal threads 110 for threadedly engaging external threads 112 on a grease nipple 114 to transport grease from a grease gun nozzle (not shown) into a cavity defined by the cylindrical inner surface 103. The wire passage 107 has a threaded gland projection 122 having external threads 123 for threadedly engaging internal threads on a gland cap 126. Wire passage 107 also has a wire opening 127 which has a truncated conical sealing surface 130. The wire passage 107, the gland cap 126 and the sealing surface 130 are dimensioned and arranged to receive a section of protective tubing 140. The protective tubing 140, which in the present embodiment is a length of ¼ inch nylon air brake tubing, has installed thereupon a sealing ferrule 142 having a generally truncated conical contact surface 143 complementary to and engagable with sealing surface 130. The sealing ferrule 142 also has a truncated conical contact surface 150 which centres the sealing ferrule to maintain the protective tubing 140 in a desired position to reduce chances of contamination of the body 95.

The locating portion 96 has a tubular locating tip 147 for engagement by the access opening 86 of the service end plate 72 to assist in maintaining the brake stroke monitoring switch 90 at a desired location and orientation relative to the air chamber 71. The locating portion 96 has a plunger or actuator opening 148 concentric with the locating tip 147 to receive the plunger rod 91 therethrough. The actuator opening 148 is dimensioned to permit a sliding fit engagement of the plunger rod 91 therewith. The locating portion 96 has a female truncated conical inner surface portion 152 and a cylindrical inner surface portion 154.

The body portion 94 has a first end surface 157 containing plunger actuator opening 108. A plastic insulating cup 158 has an outer cylindrical surface generally complementary to the main body inner surface 103, a plunger rod opening 159, a grease passage opening 160 and a wire passage opening 161, which are positioned adjacent and aligned with the plunger actuator opening 108, the grease passage 106 and the wire passage 107 respectively. A cylindrical plastic sleeve 164 has an outer surface 166 complementary to the inner surface 103, a first sleeve end 168 and a second sleeve end 170. The first sleeve end 168 abuts the insulating cup 158 at a second surface 172 thereof. The locating portion 96, when fully engaged with the body portion 94, engages the second sleeve end 170 and applies a force thereto which is transmitted through sleeve 164 to second surface 172 to maintain the insulating cup 158 in a desired location adjacent the first end surface 157. A terminal connector 180 has a ring portion 182 having an outside diameter suitable for containment within the insulating cup 158, and with an inside diameter suitable for receiving the plunger rod 91 therethrough in a non-interfering manner. The terminal connector 180 also has a connector portion 184 which extends through the spacer wire passage opening 161 and wire passage 107 and which has an opening 185. A wire 186 has a conductor portion 187 and an insulating portion 188 placed thereupon in a conventional manner, the wire portion extending into opening 185 and conventionally connected therein by soldering. The insulating portion 188 generally abuts the connector portion 184 in the vicinity of the opening 185.

The tubing 140, the connector portion 184, and the wire 186 are dimensioned and arranged such that the connector portion 184 and the wire 186 are contained within the tubing 140. The tubing extends through the wire passage 107 and partially through the spacer wire passage opening 161 and the ring portion 182 interferes with complete insertion of tubing 140.

A compression coil spring or plunger spring 190 is electrically conducting and has a first spring end 191 and a second spring end 192 and encircles the plunger rod 91 and is dimensioned to permit the plunger rod 91 to slide freely therethrough. The first spring end 191 bears upon the ring shaped portion 182 to maintain electrical contact therewith.

An annular electrical switch contact 194 has a central bore to receive the plunger rod therein and is affixed thereto. The switch contact is made of electrically conducting material such as brass and the rod 91 is preferably a stiff, tough, low friction, insulating plastic such as Delrin (trade-mark). The contact 194 encircles and is pressed into the plastic to prevent any relative movement therebetween ie. to locate the contact member axially with respect to the plunger rod. The contact 194 has a truncated conical surface 195 which is generally complementary to the conical inner surface portion 152 of the locating portion 96. The contact 194 has a similar spring engaging surface 196 for engaging the second spring end 192 to maintain electrical contact therewith. As the locating portion 96 is made of electrically conducting material, the conical inner surface portion 152 thereof serves as a fixed electrical switch contact which is contacted by the annular switch contact 194 mounted on the plunger rod, which serves as a moveable electrical switch contact. It can be seen that the fixed switch contact is fixed relative to the switch body and the moveable switch contact is responsive to movement of the plunger rod. The rod 91 thus serves as a switch actuator and the plunger spring 190 serves as a resilient member cooperating with the switch actuator to apply a force thereto to urge the electrical switch contacts together. To ensure good electrical contact, the fixed and moveable switch contacts have complementary shapes, which are preferably truncated conical in shape which assists in centering the contacts with respect to each to improve conduction thereacross which is important in the adverse conditions occurring during use—ie. heavy vibration etc.

Clearly, in the examples shown, the fixed switch contact has a female truncated conical surface and the moveable switch contact has a male truncated conical surface but other shapes are possible. In addition, it can be seen that the fixed switch contact is an annular contact member extending at least partially around the actuator opening in the body and the moveable switch contact is an annular contact member extending around the plunger rod and is complementary to the fixed switch contact. These annular contact members provide a large surface area for electrical conduction which reduces chances of intermittent contact that might otherwise occur due to the heavy vibration. The switch contact 194 also assists in aligning the plunger spring 190 coaxially with the plunger rod 91. The plunger spring 190 encircles the rod 91 and applies an axial force thereto to urge the contact 194 into electrical contact with inner surface portion 152. The spring 190 also urges the ring portion 182 into the insulating cup 158 to prevent movement and ensure good electrical contact between the connector 180 and spring 190.

As stated previously, the sleeve 164, insulating cup 158, plunger rod 91, tubing 140 and insulating portion 188 are fabricated from material eg. plastic, that is generally electrically non-conducting to prevent current flow from the conductor portion 187 to the body portion 94, through a path other than that which includes contact 194 and locating portion 96.

An electrical circuit for carrying electrical current is thus provided, with the circuit beginning with the body portion 94, continuing through threads 105 and threaded portion 104 to locating portion 96, and continuing from the conical inner surface portion 152 thereof to the conical surface 195 of the switch contact 194. The electrical circuit is continued through the plunger spring 190, through the ring shaped portion 182, the connector portion 184 and to the conductor portion 187 of the wire 186. Thus it can be seen that the connector 180 serves as a body contact which engages the first end of the spring and communicates with an electrical power supply, so that the moveable switch contact is in continuous electrical contact with the body contact through the compression coil spring.

The plunger rod 91 has a length that is selected to ensure that electrical contact between the engaging surface 196 and the locating portion 96 is first broken when the diaphragm plate 74, moving per the arrow 88, first attains the maximum slack position 74.3 and contacts the plunger tip 92 to depress the plunger into the body.

The protective end cap 98 is fabricated from a plastic material and has a vent 197, a cavity 198 and an internal threaded portion 199. The internal threaded portion 199 threadedly engages external threads on the main body portion 94. The vent 197 and cavity 198 permit the plunger rod 91 to expel grease and air present in plunger actuator opening 108 therethrough when the plunger rod 91 is moved per the arrow 88 toward the vent 197. The end cap 98 is sufficiently long to accommodate full movement of the plunger rod which occurs when the diaphragm plate 74

"bottoms out", thus preventing damage to the switch 90. The vent 197 also allows air to pass therethrough into cavity 198 when plunger rod 91 is moved away from vent 197.

Plunger rod 91, plunger spring 190, plunger actuator opening 108, cap 98 and cavity 198 are dimensioned such that plunger rod 91 may be moved slidably therethrough by diaphragm plate 74 as it travels from position 74.1 to a point at which it comes into contact with the indentations 73.

In summary, it can be seen that the switch body 95 has a proximal end portion, that is the locating portion 96, that is electrically conducting and forms the fixed switch contact, and a distal end portion, namely the main body portion 94 adjacent the insulating cup 158 which is insulated from the proximal end portion when the switch contacts are open. It can be seen that the proximal end portion has a locating portion, namely the locating tip 147, which has the actuator opening 148 therein to receive the plunger rod to extend freely therethrough with the fixed switch contact extending around the actuator opening. In addition, it can be seen that the proximal end portion has the mounting lugs 99 extending therefrom to secure the switch body to the fixed structure associated with the air brake.

Figure 4A:
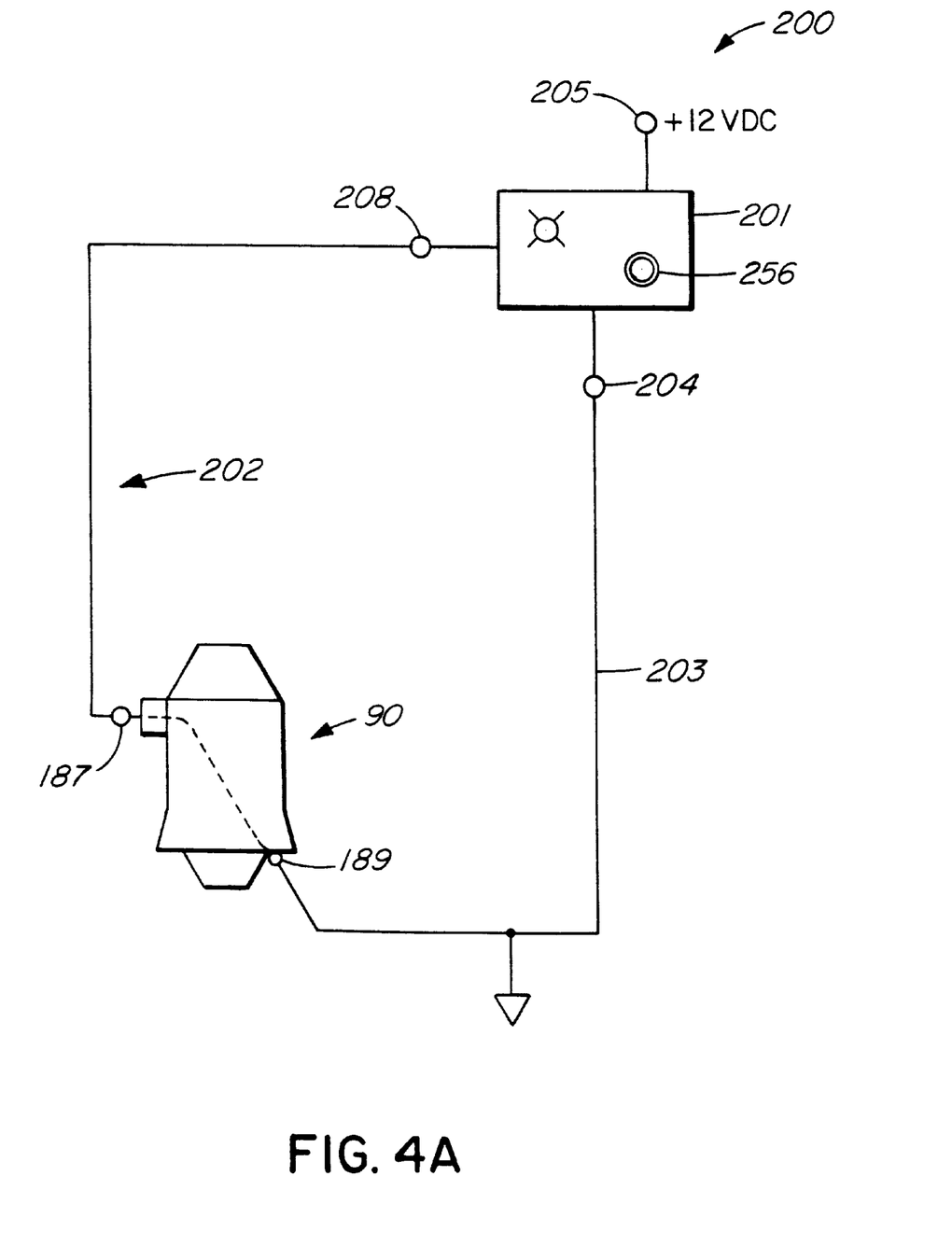
FIG. 4A is a general mechanical/electrical schematic of the monitoring switch cooperating with a brake status annunciator.
Figure 4B:
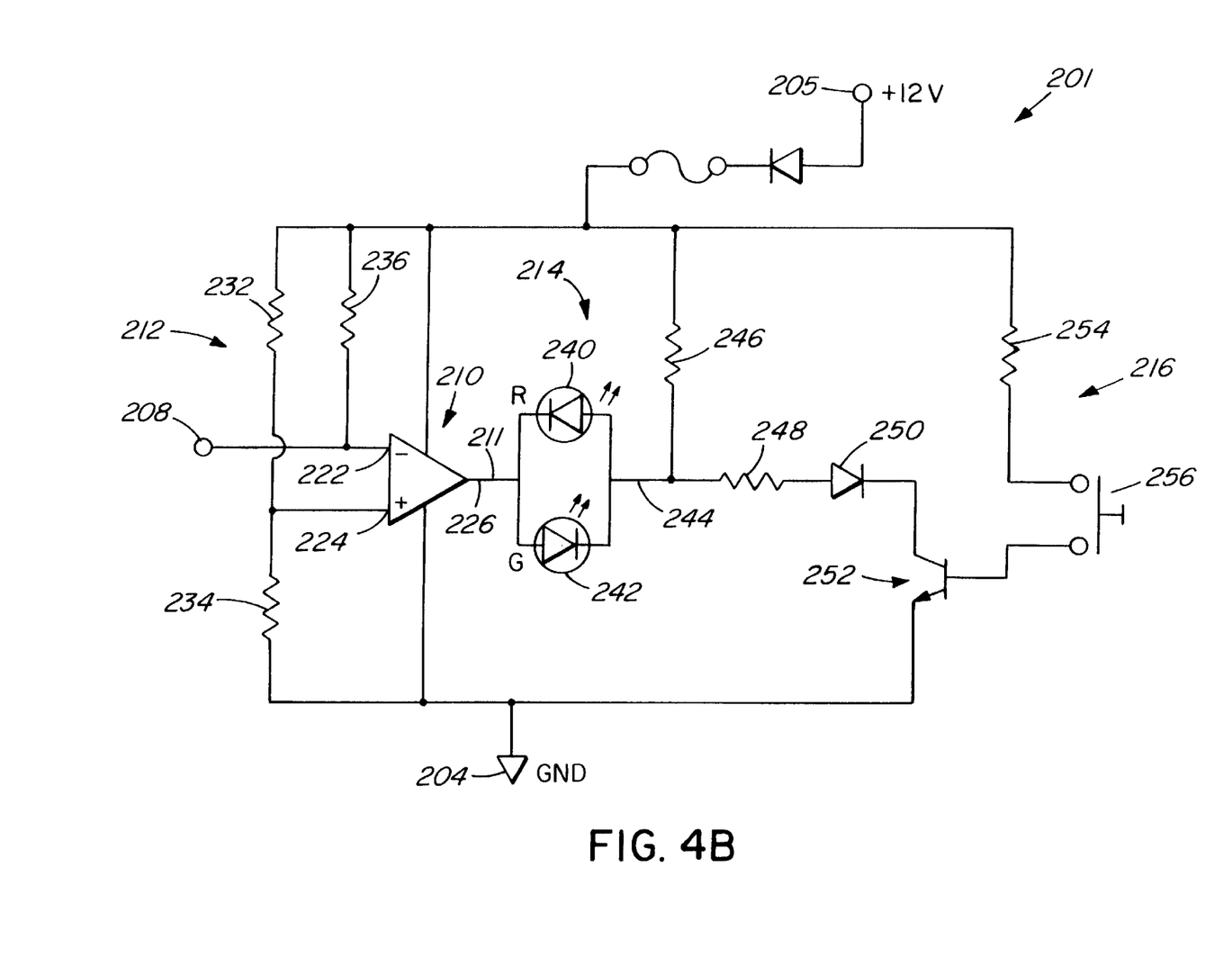
FIG. 4B is a simplified electrical schematic of the annunciator of FIG. 4A.

FIGS. 4A and 4B

Referring to FIG. 4A, the air brake monitoring circuit is shown generally at 200. The circuit includes a brake status annunciator 201 and the brake status monitoring switch 90. For simplicity, the annunciator is shown for use with one monitoring switch only, and clearly in practice, for multi-wheeled vehicles one monitoring switch is required for each wheel with a corresponding change to the annunciator. The term "brake status" refers to status of the slack adjuster mechanism and also to an inadvertent open circuit condition which can occur in the circuit connecting the monitoring switch 90 to the annunciator 201 as will be described. The brake status annunciator does not distinguish between out of adjustment brakes or an open circuit, both of which generate an "abnormal status" signal. The brake status annunciator includes first and second power terminals 204 and 205 which are connected to the vehicle ground 203 and a positive 12 volt DC supply respectively, of the vehicle. The brake status annunciator 201 further has a sensing input 208 which is connected through a wiring harness 202, to the conductor portion 187 on the brake status monitoring switch 90. The conductor portion 187 serves as a sensing contact.

The brake status monitoring switch 90 further has a ground contact 189 which is connected to the chassis ground of the vehicle and, therefore, to the first power terminal 204 of the brake status annunciator 201.

Referring to FIG. 4B, the brake status annunciator 201 includes a level sensing portion shown generally at 212, an indicator portion shown generally at 214 and a test portion shown generally at 216.

The level sensing portion includes a comparator 210 having an inverting input 222 and a non-inverting input 224. The inverting input 222 is connected to the second power terminal 205 through a first pull-up resistor 236 and defines the sensing input 208. The non-inverting input 224 is connected to two resistors 232 and 234 which act as a voltage divider between the first and second power terminals 204 and 205 to set a reference voltage level at the non-inverting input 224. In this embodiment, the reference voltage level is set at approximately 6 volts.

The comparator 210 has an output 226 which is placed in a high voltage level state when the voltage appearing at the sensing input 208 is less than 6 volts and which is placed in a low voltage state when the voltage appearing at the sensing input 208 is more than 6 volts.

The indicator portion 224 includes first and second parallel connected, oppositely disposed light emitting diodes 240 and 242 having first and second terminals 211 and 244. The first light emitting diode is red and the second light emitting diode is green. The first terminal 211 is connected to the output 226 of the comparator 210 and the second terminal is connected to first and second resistors 246 and 248. The indicator circuit 214 is connected to the second power terminal 205 through the resistor 246 and is connected to the first power terminal 204 through the second resistor 248 in series with a diode 250 and a switching transistor 252.

The operation of the switching transistor 252 is controlled by a test switch 256 which selectively connects a base of the switching transistor 252 to a pull-up resistor 254 connected to the second power terminal 205. Operation of the test switch 256 selectively turns on and off the switching transistor 252.

Thus, it can be seen that the brake status annunciator 201 and associated structure serves as a brake status monitor cooperating with the air brake stroke monitoring switch 90 and an electrical monitoring circuit to be responsive to status of the monitoring switch to indicate to an operator unacceptable brake adjustment.

Operation

Referring to FIGS. 2 and 3, if excessive slack is not present, diaphragm plate 74 will not come into contact with plunger rod tip 92 as engagement of the brake shoe apparatus with the brake drum will limit diaphragm plate 74 motion through a distance less than maximum slack. The plunger rod is thus fully extended and the contact 194 will remain in electrical contact with conical inner surface portion 152, and current will be allowed to flow therebetween. Thus electrical current passes through the contact 194 and locating portion 96, thus maintaining voltage present on conducting portion 187 at approximately zero volts DC.

Referring to FIGS. 4A and 4B, when the plunger rod of the brake status monitoring switch 90 is fully extended, the sensing contact 187 is connected to the ground contact 189 and when the plunger is depressed into the body of the brake status monitoring switch, there is no connection between sensing contact 187 and ground contact 189. Consequently, when the plunger is fully extended, the voltage appearing at the inverting input 222 is less than 6 volts and the output signal produced by the comparator at output 226 has a high voltage level.

If there is excessive slack, the diaphragm plate moves past position 74.3 and contacts the plunger rod tip 92, causing plunger rod 91 to move in the direction of the arrow 88 toward end cap 98, thus moving the contact 194 out of electrical contact with the locating portion 96, and interrupting current flow therethrough. Referring to FIGS. 4A and 4B, when the plunger is retracted into the housing, the connection between the sensing contact 187 and the ground contact 189 is broken and, therefore, resistor 236 provides a high voltage level, above 6 volts, at the non-inverting input 224 and, therefore, the signal appearing at the output 226 of the comparator 210 has a low voltage level.

When the voltage level of the output 226 of the comparator 210 is high, both the red and greed LEDs 240 and 242 are turned off. When the voltage level at the output 226 is low, the red LED 240 is activated by virtue of a circuit formed through resistor 246, the red LED 240 and the comparator 210 to the first power terminal 204. Thus, when the plunger is fully extended from the body of the switch, the contacts 187 and 189 are connected and a low voltage appears at the sensing input 208, producing a high voltage level at the output 226, keeping the red LED off. When the plunger is pushed into the body portion of the switch such that the contacts 187 and 189 are disconnected, a high voltage appears at the sensing input 208, producing a low voltage level at the output 226, turning the red LED on. As receipt of the plunger into the body portion of the switch is caused by excessive slack in the braking system, which is an abnormal condition of the braking system, the red LED indicates an abnormal condition of the brake system.

The test circuit 216 acts to provide for testing the brake status annunciator. By closing the test switch 256, the switching transistor 252 is turned on which reduces the voltage at the second terminal 244 of the indicator circuit 214. If the voltage appearing at the output 226 is high, a voltage drop in a forward biassing direction is produced across the green LED 242 thereby activating the green LED to indicate that the brake status annunciator 201 is in working order.

Thus, brake status may be detected by a vehicle operator during brake actuation by observing visible light emitted by the two colour indicator 212. Visible red light emitted indicates excessive slack or interruption of the electrical circuit formed between vehicle chassis, brake monitoring switch 90, conducting portion 187 and brake sensing input 208. Either of these conditions requires action by the driver to enable safe operation. The absence of emitted visible light is generally indicative of correctly adjusted brakes and a closed electrical circuit which can be verified by causing green visible light to be emitted when test switch 256 is depressed.

In summary, the monitoring 90 switch is relatively simple to secure adjacent the access opening 86 by providing two openings 101 in the end plate. This requires a total of three openings to be prepared in the prior art chamber. The switch actuator ie. the rod 91, extends through the access opening to be contacted by the diaphragm plate when subjected to a predetermined travel which represents unacceptable brake stroke, so as to open the switch contacts to actuate the alarm. The actuator is contained within the brake chamber and thus is isolated from dirt and therefore protected from damage. Switch maintenance requirements are minimal as the monitoring switch is actuated only when the brake stroke is out of adjustment and thus is subject to essentially no wear if the brakes are adjusted properly. To ensure the switch will open when required, the switch body is maintained essentially filled with grease to reduce or eliminate contamination.

It can be seen that the electrical switch contacts are maintained closed for normal operation of the brakes, that is when the brake stroke adjustment is within acceptable limits. Thus, the switch is a normally-closed switch which de-activates the alarm, and the switch is opened to activate the alarm only when brake stroke exceeds a predetermined maximum. Any switch contact failure or poor electrical contact in the switch itself, or an inadvertent break occurring in the related electrical circuit also activates the alarm and thus the switch is inherently "fail-safe" and thus provides an advantage over a normally-open switch as found in some prior art references.

In summary, it can be seen that a method according to the invention comprises the steps of:
   during brake actuation in which the brake stroke is acceptable, maintaining electrical switch contacts of a brake stroke monitoring switch closed to conduct electricity to actuate an annunciator to indicate acceptable brake stroke adjustment; and
   during brake actuation in which the brake stroke is unacceptable, opening the electrical contacts to actuate the annunciator to indicate unacceptable brake stroke.

The switch contacts are maintained closed resiliently and are shaped to resist disengagement due to vibration.

Alternatives

In the preferred embodiment, the portions 94 and 96 of the switch body 95 of the sensor switch are made of a conducting material, eg. metal, and thus form a portion of the electrical monitoring circuit. In an alternative, not shown, injection moulded plastic components can be substituted for one or both of the metal portions that presently form a portion of the electrical circuit. In this alternative, a well known method of adding an electrical conductive strip would be used to provide the necessary electrical continuity across the insulating plastic material.

In addition, in the preferred embodiment the electrical conductors leading from the switch contacts and encased in protective tubing extend from a distal portion of the switch body, ie. a portion which is remote from the service end of the air chamber. In an alternative, shown in broken outline in FIG. 6, the electrical conductors leading from the switch in a protective tubing can be located at an opposite or proximal end of the body so as to be closely adjacent the service end of the air chamber, thus improving protection of the tubing due to proximity to the air chamber.

Also, in the preferred embodiment, electrical switch contacts are opened and closed by axial or linear movement of the plunger and this is preferred for simplicity and ruggedness. In an alternative, not shown, displacement of the electrical switch contacts can be other than linear, for example, rotational or non-linear movement between the switch contacts can be substituted with a suitable design change to accommodate resilient or spring closing of the contacts for normal operation of the switch.

Furthermore, in the preferred embodiment, the particular Type 30 air chamber has a service end plate incorporating diametrically opposed indentations conveniently placed for mounting the switch. In service end plates of different manufacture, the indentations may differ from those shown in FIGS. 2 and 3 or may be omitted altogether. In an alternative described in FIGS. 5 and 6, an alternative switch body has a generally flat proximal end face through which the plunger projects. The plunger then extends through an opening located in a generally flat area of the service end plate of the air chamber. This contrasts with the first embodiment in which the switch body has a truncated conical projection on the proximal end face through which the plunger extends, and in which the projection is fitted into an existing indentation in the service end plate.

And finally, in the preferred embodiment, the service end plate may be initially manufactured with the switch in place, in which case fasteners and openings suitable for mounting the switch can be incorporated into the design of the service end plate. For retrofitting the switch to an existing air chamber, only the original service end plate need be removed and the suitably modified service end plate substituted. In the alternative described in FIGS. 5 and 6, a bracket is provided which may be used to mount the switch, thus permitting a relatively easy retrofit of the switch to an existing air chamber with a need to drill only a single hole for the plunger rod.

Clearly, many permutations and combinations of the above alternatives are available. For example, if the alternative mounting bracket of FIGS. 5 and 6 were to be used on an service end plate having an indentation as shown in FIGS. 2 and 3, the sensor switch of FIGS. 2 and 3 could be substituted for the switch shown in FIGS. 5 and 6, in which case the mounting lugs 99 of FIG. 3 could be eliminated. Similarly, the projecting portion of the preferred embodiment could be eliminated to resemble the generally flat proximal end face of the alternative sensor switch of FIGS. 5 and 6, in which case the modified preferred embodiment could be used on a air brake chamber having a generally flat service end plate, that is without the indentations as shown in FIGS. 2 and 3.

Figure 5:
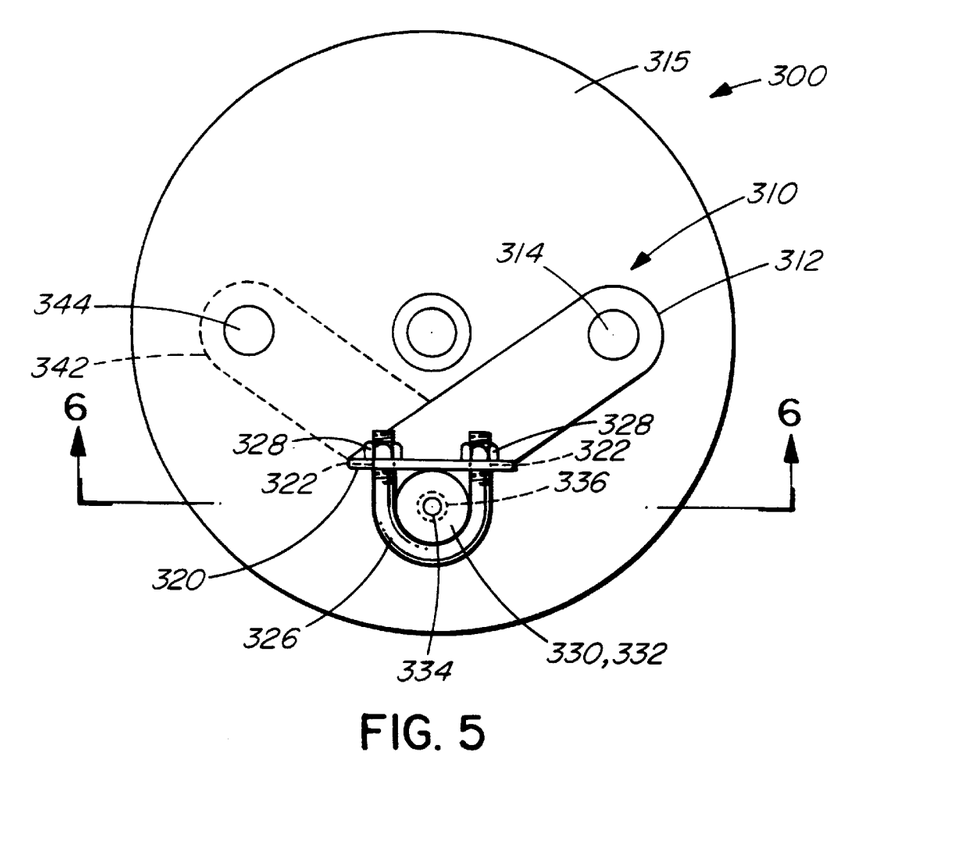
FIG. 5 is an elevation of a first alternative switch mounting arrangement and an alternative switch according to a second embodiment of the invention.
Figure 6:
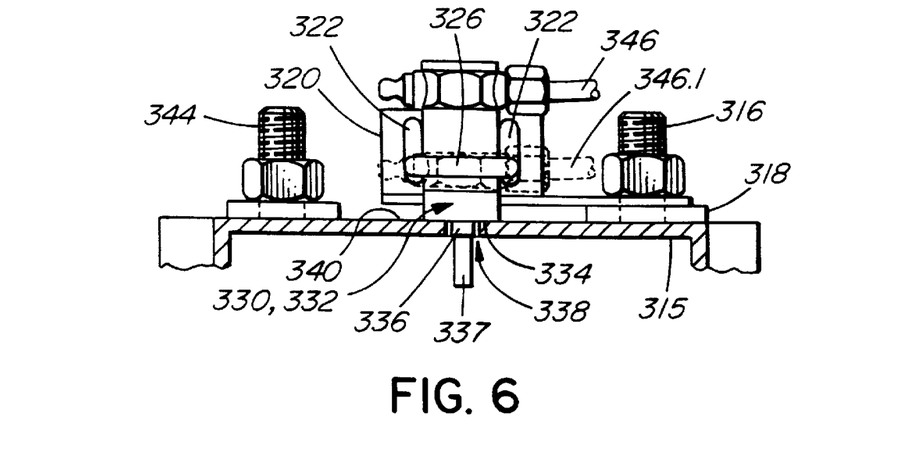
FIG. 6 is a simplified, fragmented section on line 6—6 of FIG. 5, showing the switch and a portion of the service end plate.

FIGS. 5 and 6

The preferred embodiment of FIGS. 2 and 3 requires providing three openings in the service end plate 72 of the air chamber 71 to receive the plunger rod and two mounting bolts for securing the monitoring switch 90 to the air chamber 71. In an alternative embodiment 300 of FIGS. 5 and 6, the sensor switch is mounted on a separate bracket which uses at least one existing fastener, thus eliminating the need for the two fastener openings of the preferred embodiment. Thus, for use as a retrofit unit as previously described, the alternative embodiment has some advantages.

As best seen in FIG. 5, a mounting bracket 310 has a proximal end 312 having an opening 314 to receive a stud 316, which is usually used to secure an alternative air chamber 315 to the mounting lug 318 of the vehicle which is equivalent to the plate 42 of FIG. 1. The bracket 310 has an upturned flange 320 adjacent a distal end thereof opposite to the proximal end, the flange having a pair of openings 322 to receive ends of a U-bolt 326 passing therethrough and secured thereto with nuts 328. The switch 330 has a switch body 332 which is generally complementary to a portion of the U-bolt 326, so that tightening the nuts 328 on the U-bolt 326 draws the switch 330 snugly against the flange 320 to retain the switch 330 in a correct orientation relative to the air chamber 315.

As seen in FIG. 6, the switch body 332 has a generally flat proximal end face 334 with a short tubular locating tip 336 projecting therefrom, through which a plunger 337 projects axially similarly to the tip 147 and plunger 91 of FIG. 3. The locating tip 336 passes through an aligned access opening 338 in a flat area 340 of the air chamber 315 so as to locate the switch body with respect to the service end plate of the air chamber. Similarly to the previously described embodiment, the plunger 337 passes through the opening in the locating tip 336, and thus through the access opening 338 in the flat area 340, to contact the diaphragm plate, not shown, so as to be responsive to movement thereof.

As seen only in FIG. 6, the openings 322 are elongated slots which are disposed parallel to each other and generally perpendicularly to the flat area 340 of the air chamber 315. The slots provide a small range of perpendicular adjustment of the switch body with respect to the air chamber. This is because it is not necessary that the end face 334 of the switch contacts the flat area 340 of the service end plate. The spacing between the face 334 and the flat area 340 can be adjusted by loosening the nuts 328 and moving the switch 330 perpendicularly relative to the face 340 so as to vary spacing therebetween. Actual location of the switch body with respect to the air brake chamber is determined by length of the plunger 337 and relative location of the diaphragm plate, not shown, of the chamber 315, which permits a wide range of adjustment as may be required in retrofit situations, or where a service end plate is replaced by a spare part of different manufacturer.

It can be seen that the switch body is located with respect to the access opening by the tubular locating tip 336 and the bracket 310. In some installations, this arrangement may be vulnerable to damage as an inadvertent blow on the bracket or switch 330 could impose lateral forces on the locating tip which could result in sufficient inadvertent rotation of the bracket 310 about the stud 316 to cause damage to or misalignment of the switch mechanism. To reduce or eliminate this risk, an alternative bracket 342, shown in broken outline in FIG. 5, extends from an opposite stud 344 to connect to the bracket 310 adjacent the flange 320. Thus the mounting of the switch is effectively triangulated and thereby stiffened against such inadvertent movement. Clearly, the additional bracket 342 could be made integral with the bracket 310 and thus would be a generally shallow V-shaped bracket. It can be seen that the U-bolt and associated nuts serve as a clamp for securing the switch body to the distal end portion of the mounting bracket. Clearly, other clamps could be devised which would permit easy fastening of the switch body to the mounting bracket 310, and in some instances a flange at the distal end portion would not be required with certain designs of clamps. Clearly, to increase versatility, it is best if means are provided to permit adjustment of location of the switch body with respect to the air chamber during installation.

As shown only in FIG. 6, an electrical conductor 346 extends from a distal end portion of the switch body 332 in a manner generally similar to that shown in FIG. 3 with reference to the preferred embodiment of the switch. As previously discussed, in one alternative, the electrical conductor could be relocated to extend from the proximal end portion of the switch as shown in broken outline at 346.1, so as to be closer to the service end plate and thus less vulnerable to damage. Similarly, where a grease nipple is provided, it may be relocated in a like manner.

What is claimed is:

1. An electrical switch for an air brake stroke monitoring apparatus, the switch comprising:
   (a) a switch body securable to a fixed structure associated with the air brake;
   (b) fixed and moveable electrical switch contacts, the fixed switch contact being fixed relative to the switch body;
   (c) a switch actuator mounted for movement relative to the switch body and cooperating with the moveable switch contact to move the moveable switch contact into and out of engagement with the fixed switch contact, the switch actuator being selectively responsive to movement of a brake mechanism associated with air brake actuation; and
   (d) a resilient member cooperating with the switch actuator and the switch body to apply a force to the switch actuator to urge the switch contacts together.

2. A switch as claimed in claim 1 in which:
   (a) the fixed and moveable switch contacts have complementary shapes.

3. A switch as claimed in claim 2 in which:
   (a) the switch contacts are truncated conical in shape.

4. A switch as claimed in claim 3 in which:
   (a) the fixed switch contact has a female truncated conical surface; and
   (b) the moveable switch contact has a male truncated conical surface.

5. A switch as claimed in claim 1 in which:
   (a) the switch actuator is an axially elongated plunger rod mounted for reciprocable movement along an axis thereof; and
   (b) the moveable switch contact is mounted on the plunger rod.

6. A switch as claimed in claim 5 in which:
   (a) the moveable switch contact is an annular contact member having a central bore to receive the plunger rod therein, the contact member being located axially with respect to the plunger rod, the contact member having a male truncated conical surface extending therearound to be concentric with the plunger rod.

7. A switch as claimed in claim 1 in which:
(a) the switch actuator is an axially elongated plunger rod mounted for reciprocable movement along an axis thereof;
(b) the switch body has an actuator opening therein to receive the plunger rod to pass freely therethrough;
(c) the fixed switch contact is adjacent the actuator opening in the switch body; and
(d) the moveable switch contact is mounted on the plunger rod for movement therewith so as to be brought into and out of contact with the fixed switch contact on the switch body.

8. A switch as claimed in claim 7 in which:
(a) the fixed switch contact is a annular contact member extending at least partially around the actuator opening in the switch body; and
(b) the moveable switch contact is a second annular contact member extending around the plunger rod and is complementary to the fixed switch contact.

9. A switch as claimed in claim 8 in which:
(a) the fixed switch contact has a female truncated conical surface located so as to be generally concentric with the actuator opening;
(b) the moveable contact switch has a male truncated conical surface complementary to the fixed switch contact, the moveable switch contact extending around the plunger rod; and
(c) the resilient member is a compression coil spring encircling the plunger rod to apply an axial force thereto.

10. A switch as claimed in claim 1, in which:
(a) the switch actuator is an axially elongated plunger rod mounted for reciprocable movement along an axis thereof; and
(b) the resilient member is a compression coil spring encircling the plunger rod to apply an axial force thereto.

11. A switch as claimed in claim 10, in which:
(a) the compression coil spring is electrically conducting and has first and second ends;
(b) the moveable switch contact is mounted on the plunger rod and is in contact with the second end of the spring; and
(c) a body contact engages the first end of the spring and communicates with an electrical power supply, so that the moveable switch contact is in continuous electrical contact with the body contact through the compression coil spring.

12. A switch as claimed in claim 11 in which:
(a) the plunger rod is an electrically insulating material;
(b) the moveable switch is an electrically conducting material and encloses the plunger rod so as to be secured thereto;
(c) the switch body has a proximal end portion that is electrically conducting and forms the fixed switch contact; and
(d) the switch body has a distal end portion and the body contact is adjacent the distal end portion and is insulated from the proximal end portion when the switch contacts are open.

13. A switch as claimed in claim 12 in which:
(a) the proximal end portion has a locating portion with an actuator opening therein to receive the plunger rod to extend freely therethrough with the fixed switch contact extending around the actuator opening.

14. A switch as claimed in claim 13 in which:
(a) the proximal end portion has a tubular locating tip with the actuator opening extending therethrough.

15. A switch as claimed in claim 12 in which:
(a) the proximal end portion has mounting lugs extending therefrom to secure the switch body to the fixed structure associated with the air brake.

16. A switch as claimed in claim 1, further comprising:
(a) a brake wear monitor adapted to cooperate with the electrical switch and an electrical monitoring circuit to be responsive to status of the electrical switch to indicate unacceptable brake stroke to an operator.

17. An air brake apparatus for activating a brake, the apparatus comprising:
(a) an air brake air chamber having: a chamber body securable to a fixed structure; a flexible diaphragm cooperating with the chamber body to divide the chamber body into first and second spaces which are exposable to a pressure differential; a pushrod and diaphragm plate assembly mounted for reciprocable axial movement relative to the chamber body and cooperating with the diaphragm to be responsive to the pressure differential, the pushrod having an outer end connectable to brake actuating structure;
(b) an electrical air brake stroke monitoring switch having a switch body securable to the chamber body chamber, the monitoring switch also having: a switch actuator responsive to movement of the pushrod; fixed and moveable electrical switch contacts, the fixed switch contact being fixed relative to the switch body and the moveable switch contact being responsive to movement of the switch actuator; and a resilient member cooperating with the switch actuator to apply a force thereto to urge the switch contacts together; and
(c) a brake status monitor cooperating with the air brake stroke monitoring switch and an electrical monitoring circuit to be responsive to status of the monitoring switch to indicate to an operator unacceptable brake stroke.

18. An apparatus as claimed in claim 17 in which:
(a) the chamber body has an access opening therein; and
(b) the monitoring switch is secured adjacent the access opening and the switch actuator extends through the access opening to be contacted by the diaphragm plate when subjected to a predetermined travel which represents unacceptable brake stroke, so as to open the switch contacts.

19. An apparatus as claimed in claim 18, in which:
(a) the chamber body has first and second body portions which define with the flexible diaphragm the first and second spaces respectively, the first space being exposable to braking pressure, and the second body portion having a pushrod opening to receive the pushrod extending axially therethrough and having said access opening to receive the switch actuator which extends axially therethrough;
(b) the diaphragm has an outer periphery sandwiched between and secured to the first and second body portions; and
(c) the diaphragm plate is located in the second space to be contacted by the switch actuator so as to protect the diaphragm from contact with the switch actuator.

20. An apparatus as claimed in claim 18 in which:
(a) the switch body has a proximal end portion having an actuator opening to receive the actuator extending freely therethrough, the actuator also extending into the access opening of the chamber body.

21. An apparatus as claimed in claim 20 in which:
(a) the proximal end portion has a tubular locating tip with the actuator opening extending therethrough, the locating tip extending through the access opening of the chamber body to assist in locating the switch body relative to the chamber body.

22. An apparatus as claimed in claim 21 in which:
(a) the proximal end portion has mounting lugs extending therefrom, each lug having a fastener opening therein to receive a fastener; and
(b) a portion of the chamber body adjacent the access opening has fastener openings therein to be aligned with the fastener openings in the mounting lugs to receive the fasteners passing therethrough to secure the switch body to the chamber body.

23. An apparatus as claimed in claim 20 in which:
(a) a portion of the chamber body adjacent the access opening has an indentation extending at least partially around the access opening; and
(b) the proximal end portion of the switch body is at least partially received in the indentation.

24. An apparatus as claimed in claim 20 further comprising:
(a) a plurality of threaded fasteners cooperating with the chamber body to secure the chamber body to the fixed structure;
(b) a mounting bracket having a proximal end portion and a distal end portion, the proximal end portion of the mounting bracket cooperating with one of the threaded fasteners to secure the mounting bracket thereto; and
(c) a clamp for securing the switch body to the distal end portion of the mounting bracket.

25. An apparatus as claimed in claim 24 in which:
(a) the distal end portion of the mounting bracket has a flange with two clamp openings therein; and
(b) the clamp is a U-bolt which passes around the switch body and cooperates with the two clamp openings to secure the switch body to the flange.

26. An apparatus as claimed in claim 25 in which:
(a) the openings in the flange are slotted openings which are disposed generally perpendicularly to the air brake air chamber to permit perpendicular adjustment of the switch body with respect to the air chamber.

27. A method of monitoring brake stroke in an air brake apparatus, the method comprising:
(a) during brake actuation in which the brake stroke is acceptable, applying a force to a switch actuator of a brake stroke monitoring switch to urge a moveable electrical switch contact of said switch into engagement with a fixed electrical switch contact of said switch to actuate an annunciator to indicate acceptable brake stroke adjustment; and
(b) during brake actuation in which the brake stroke is unacceptable, actuating said switch actuator to move said switch contacts apart to actuate the annunciator toindicate unacceptable brake stroke.

28. A method as claimed in claim 27:
(a) wherein applying said force comprises maintaining the electrical switch contacts closed resiliently.

29. A method as claimed in claim 27
wherein actuating said switch actuator comprises moving said switch actuator in response to movement of brake mechanism associated with air brake actuation.

* * * * *